United States Patent
Xu et al.

(10) Patent No.: US 12,425,349 B2
(45) Date of Patent: Sep. 23, 2025

(54) SYSTEM AND METHOD TO SYNCHRONIZE MOTION CONNECTION COMMUNICATION TO TIME-SENSITIVE NETWORKS FOR INDUSTRIAL SYSTEMS

(71) Applicant: ROCKWELL AUTOMATION TECHNOLOGIES, INC., Mayfield Heights, OH (US)

(72) Inventors: Dayin Xu, Shanghai (CN); Chao Chen, Shanghai (CN); Yi Yu, Shanghai (CN); Mark R. Cooper, Eden Prairie, MN (US); Jun Li, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 282 days.

(21) Appl. No.: 18/123,647

(22) Filed: Mar. 20, 2023

(65) Prior Publication Data
US 2024/0323131 A1 Sep. 26, 2024

(51) Int. Cl.
*H04L 47/283* (2022.01)
*H04L 47/56* (2022.01)
*H04L 67/12* (2022.01)

(52) U.S. Cl.
CPC ............ *H04L 47/283* (2013.01); *H04L 47/56* (2013.01); *H04L 67/12* (2013.01)

(58) Field of Classification Search
CPC ........ H04L 47/283; H04L 47/56; H04L 67/12
See application file for complete search history.

(56) References Cited

U.S. PATENT DOCUMENTS

| | | | |
|---|---|---|---|
| 7,904,184 B2 | 3/2011 | Chaffee | |
| 7,983,769 B2 | 7/2011 | Chaffee et al. | |
| 11,336,582 B1* | 5/2022 | Francini | H04L 47/28 |
| 12,040,995 B2* | 7/2024 | Iwasawa | H04L 47/826 |
| 2020/0259896 A1* | 8/2020 | Sachs | H04L 67/12 |
| 2023/0379215 A1* | 11/2023 | Chubanov | H04L 41/0816 |
| 2023/0412522 A1* | 12/2023 | Iwasawa | H04L 47/826 |
| 2024/0188123 A1* | 6/2024 | Cha | H04W 74/08 |
| 2024/0323131 A1* | 9/2024 | Xu | H04L 47/283 |

* cited by examiner

*Primary Examiner* — David R Lazaro
(74) *Attorney, Agent, or Firm* — Quarles & Brady LLP

(57) ABSTRACT

Systems and methods for synchronizing motion connection communication to time-aware network for industrial systems. One system includes an electronic processor configured to determine a controller Qbv configuration for an industrial controller included in a TSN. The electronic processor is also configured to determine, based at least in part on the controller Qbv configuration, a first start of a Qbv slot for isochronous traffic for an industrial device included in the TSN. The electronic processor is also configured to adjust, based at least in part on the first start of the Qbv slot for isochronous traffic for the industrial device, network scheduling for the industrial device. The electronic processor is also configured to deploy the adjusted network scheduling to the industrial device.

18 Claims, 10 Drawing Sheets

SYSTEM AND METHOD TO SYNCHRONIZE MOTION CONNECTION COMMUNICATION TO TIME-SENSITIVE NETWORKS FOR INDUSTRIAL SYSTEMS

CROSS-REFERENCES TO RELATED APPLICATIONS

Not applicable.

BACKGROUND INFORMATION

Industrial networks are getting larger and more complex. The time sensitive networking ("TSN") industrial profile has been developed as a guideline to meet the demands of industrial devices (such as, e.g., IEC/IEEE 60802). For a converged TSN network (e.g., video surveillance, motion control, etc.), two new challenges arise for common industrial protocol ("CIP") motion applications, including, e.g., end station challenges and network challenges. As one non-limiting example, with respect to end station challenges, a CIP motion controller and drive's asynchronous access to a TSN may cause significant access latency. Alignment of motion application data and scheduled network access may vary. This variation may result in lost and/or late delivery of application data. As another non-limiting example, with respect to network challenges, unscheduled CIP motion traffic may be delayed by the higher priority scheduled traffic in a network. These additional latencies from the end station, the network, or a combination thereof may degrade CIP motion performance and may even cause CIP motion applications not to work.

Accordingly, there is a need for synchronization of motion connection communication to the TSN for industrial systems.

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

To address the challenges and technical problems described herein, the technology described herein provides systems and methods that support synchronous network access ("SNA") in a CIP motion controller and a CIP motion drive (or other industrial motion device) to ensure the CIP motion traffic arrives at the scheduled time within the TSN (e.g., at a physical media interface at the scheduled time). In some configurations, the technology disclosed herein may support network scheduling for CIP motion traffic in a converged TSN network to ensure CIP motion traffic is not delayed by other traffic (e.g., other scheduled traffic).

Accordingly, configurations described herein provide systems and methods for synchronizing motion connection communication to time-sensitive networks for industrial systems. One configuration provides a system for synchronizing motion connection communication to time-sensitive networks for industrial systems. The system includes an electronic processor configured to determine a controller Qbv configuration for an industrial controller included in a TSN. The electronic processor is also configured to determine, based at least in part on the controller Qbv configuration, a base start of a controller update period for the industrial controller. The electronic processor is also configured to determine, based at least in part on the controller Qbv configuration, a first start of a Qbv slot for isochronous traffic for an industrial device included in the TSN. The electronic processor is also configured to adjust, based at least in part on the first start of the Qbv slot for isochronous traffic for the industrial device, network scheduling for the industrial device.

Another configuration provides a method for synchronizing motion connection communication to time-sensitive networks for industrial systems. The method includes determining, with an electronic processor, a controller Qbv configuration for an industrial controller included in a TSN. The method also includes determining, with the electronic processor, a device Qbv configuration for an industrial device included in the TSN. The method also includes determining, with the electronic processor, based on the controller Qbv configuration, a base start of a Qbv slot for isochronous traffic for the industrial controller. The method also includes determining, with the electronic processor, based at least in part on the base start of the Qbv slot for isochronous traffic for the industrial controller, a base start of controller update period for the industrial controller. The method also includes determining, with the electronic processor, based at least in part on the base start of the Qbv slot for isochronous traffic for the industrial controller, a first start of a Qbv slot for isochronous traffic for the industrial device. The method also includes adjusting, with the electronic processor, based at least in part on the first start of the Qbv slot for isochronous traffic for the industrial device, network scheduling for the industrial device. The method also includes deploying, with the electronic processor, the adjusted network scheduling to the industrial device.

Yet another configuration provides a non-transitory computer-readable medium storing instructions that, when executed by an electronic processor, perform a set of functions. The set of functions includes determining a controller Qbv configuration for an industrial controller included in a TSN. The set of functions also includes determining a device Qbv configuration for an industrial device included in the TSN. The set of functions also includes determining, based on the controller Qbv configuration, a base start of a Qbv slot for isochronous traffic for the industrial controller. The set of functions also includes determining, based at least in part on the base start of the Qbv slot for isochronous traffic, a first start of a Qbv slot for isochronous traffic for the industrial device. The set of functions also includes adjusting, based at least in part on the first start of the Qbv slot for isochronous traffic for the industrial device and the device Qbv configuration, network scheduling for the industrial device. The set of functions also includes deploying the adjusted network scheduling to the industrial device.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
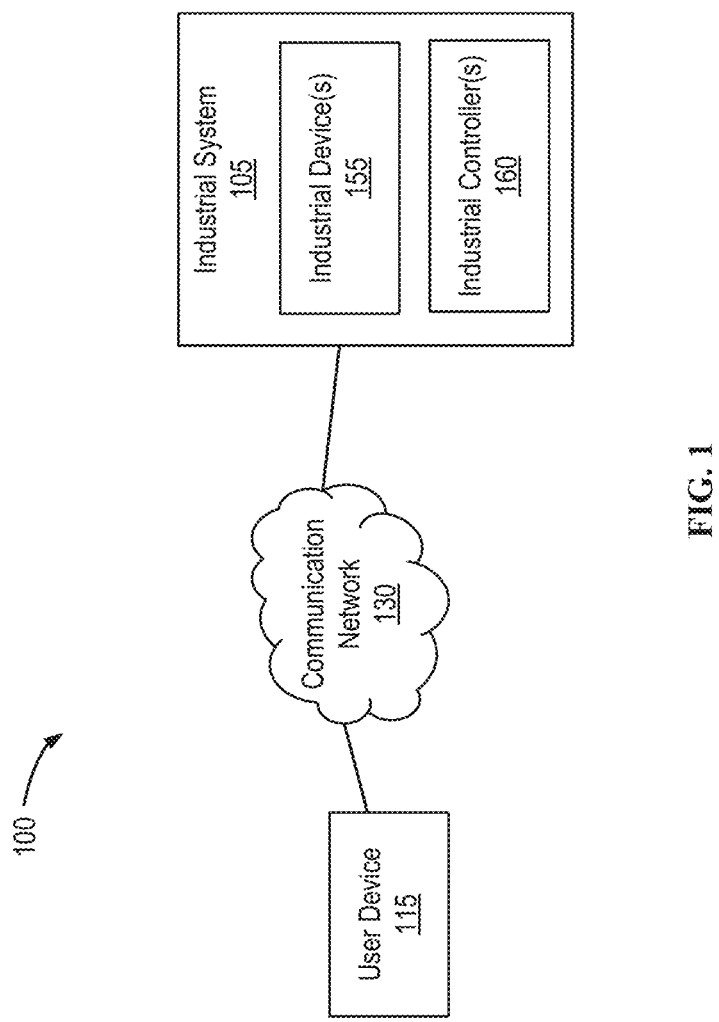
FIG. 1 schematically illustrates a system for synchronizing motion connection communication to time-sensitive networks for industrial systems according to some configurations.

As utilized herein, terms "component," "system," "controller," "device," "manager," "computer module," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for synchronizing motion connection communication to time-sensitive networks for industrial systems according to some configurations. In the illustrated example, the system 100 may include an industrial system 105 and a user device 115. In some configurations, the system 100 includes fewer, additional, or different components in different configurations than illustrated in FIG. 1. As one non-limiting example, the system 100 may include multiple industrial systems 105, multiple user devices 115, or a combination thereof. As another non-limiting example, one or more components of the system 100 may be combined into a single device.

Alternatively, or in addition, in some configurations, the user device 115 may be included as part of the industrial system 105 (e.g., as a component of the industrial system 105).

The industrial system 105 and the user device 115 may communicate over one or more communication networks 130. The one or more communication networks 130 may include a wired communication network, a wireless communication network, or a combination thereof. Portions of the communication networks 130 may be implemented using a wide area network, such as the Internet, a local area network, such as a WI-FI®, and combinations or derivatives thereof. Alternatively, or in addition, in some configurations, components of the system 100 may communicate directly as compared to through the communication network 130. Also, in some configurations, the components of the system 100 may communicate through one or more intermediary devices not illustrated in FIG. 1. In some configurations, the communication network 130 may be a time-sensitive network (TSN) or another type of time aware network. Accordingly, in some configurations, the communication network 130 may also be referred to herein as "the TSN 130." In such configurations, the system 100 (and the components thereof) may be or form a TSN.

The industrial system 105 may be a manufacturing system, such as, e.g., an industrial automation system or the like. The industrial system 105 may perform one or more industrial processes, manufacturing processes, production processes, or the like. In some embodiments, the industrial system 105 may perform a production method that produces goods or products. As one non-limiting example, the industrial system 105 may perform a vehicle manufacturing process to assemble or produce a vehicle (or various components thereof). As another non-limiting example, the industrial system 105 may perform a food manufacturing process for making a food product.

In the illustrated example, the industrial system 105 may include one or more industrial devices 155 (referred to herein collectively as "the industrial devices 155" and individually as "the industrial device 155") and one or more industrial controllers 160 (referred to herein collectively as "the industrial controllers 160" and individually as "the industrial controller 160"). In some configurations, the industrial system 105 includes fewer, additional, or different components in different configurations than illustrated in FIG. 1.

The industrial device 155 may be a physical piece of equipment included in the industrial system 105. For example, the industrial device 155 may include a pump, a drive, a press, a conveyor, an actuator, a valve, an additional industrial control device (e.g., a programmable logic controller ("PLC"), industrial compute module, network switch, and the like), a switch, a sensor, a server, a database, an additional HMI, another piece of equipment that may be used in connection with an associated industrial process (or subprocess) or application of the industrial system 105, or the like. As another non-limiting example, the industrial device 155 may be an industrial motion device implemented within a CIP motion application, such as, e.g., an industrial motion drive or a CIP motion drive. The industrial controller 160 may include a programmable logic controller ("PLC"), another type of industrial controller, or the like.

As illustrated in FIG. 1, the system 100 may also include the user device 115. The user device 115 may be a computing device, such as a desktop computer, a laptop computer, a tablet computer, a terminal, a smart telephone, a smart television, a smart wearable, or another suitable computing device that interfaces with a user.

Figure 2:
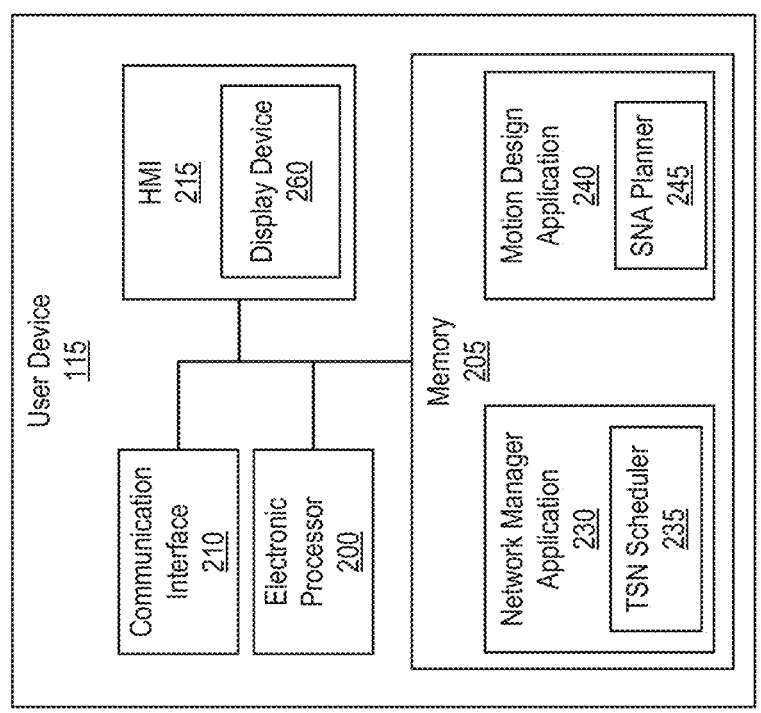
FIG. 2 schematically illustrates a user device of the system of FIG. 1 according to some configurations.

As illustrated in FIG. 2, the user device 115 may include an electronic processor 200, a memory 205, a communication interface 210, and a human-machine interface ("HMI") 215. The electronic processor 200, the memory 205, the communication interface 210, and the HMI 215 may communicate wirelessly, over one or more communication lines or buses, or a combination thereof. The user device 115 may include additional components than those illustrated in FIG. 2 in various configurations. The user device 115 may also perform additional functionality other than the functionality described herein. Also, the functionality (or a portion thereof) described herein as being performed by the user device 115 may be distributed among multiple devices (e.g., as part of a cloud service or cloud-computing environment), combined with another component of the system 100 (e.g., combined with a server, a database, another component of the system 100, or the like), or a combination thereof.

The communication interface 210 may include a transceiver that communicates with the industrial system 105 over the communication network 130 and, optionally, one or more other communication networks or connections. In some configurations, the communication interface 210 enables the user device 115 to communicate with the industrial system 105 over one or more wired or wireless connections. The electronic processor 200 may include a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

As one non-limiting example, as illustrated in FIG. 2, the memory 205 may include network manager application 230, including a TSN scheduler 235, and a motion design application 240, including an SNA planner 245. The network manager application 230 (including the TSN scheduler 235), the motion design application 240 (including the SNA planner 245), or a combination thereof may be software application executable by the electronic processor 200 in the example illustrated and as specifically discussed below, although a similarly purposed module may be implemented in other ways in other examples. Although FIG. 2 illustrates the network manager application 230 (including the TSN scheduler 235) and the motion design application 240 (including the SNA planner 245) being stored in the memory 205, in some configurations, the network manager application 230 (including the TSN scheduler 235), the motion design application 240 (including the SNA planner 245), or a combination thereof may be stored external to the memory 205, such as in one or more remote devices (e.g., a database, a server, etc.).

The electronic processor 200 may execute the network manager application 230, the motion design application 240, or a combination thereof to synchronize CIP motion connection communication in the industrial controller(s) 160 and the industrial device(s) 155 to the TSN, such that the industrial controller(s) 160 and the industrial device(s) 155 network access latency and jitter is reduced in a converged TSN network to increase CIP motion performance. In some configurations, the electronic processor 200 may execute the network manager application 230 as part of facilitating or providing TSN scheduling functionality, including, e.g., a scheduling calculation service, a scheduling adjustment service, or a combination thereof (e.g., via the TSN scheduler 235), as described in greater detail herein. Alternatively, or in addition, in some configurations, the electronic processor 200 may execute the motion design application 240 as part of facilitating or providing a SNA planning service (e.g., via the SNA planner 245), as described in greater detail herein.

As illustrated in FIG. 2, the user device 115 may include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the user device 115. For example, the HMI 215 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof. As illustrated in FIG. 2, in some configurations, the HMI 215 includes a display device 260. The display device 260 may be included in the same housing as the user device 115 or may communicate with the user device 115 over one or more wired or wireless connections. For example, in some configurations, the display device 260 is a touchscreen included in a laptop computer or a tablet computer. In other configurations, the display device 260 is a monitor, a television, or a projector coupled to a terminal, desktop computer, or the like via one or more cables.

Figure 3:
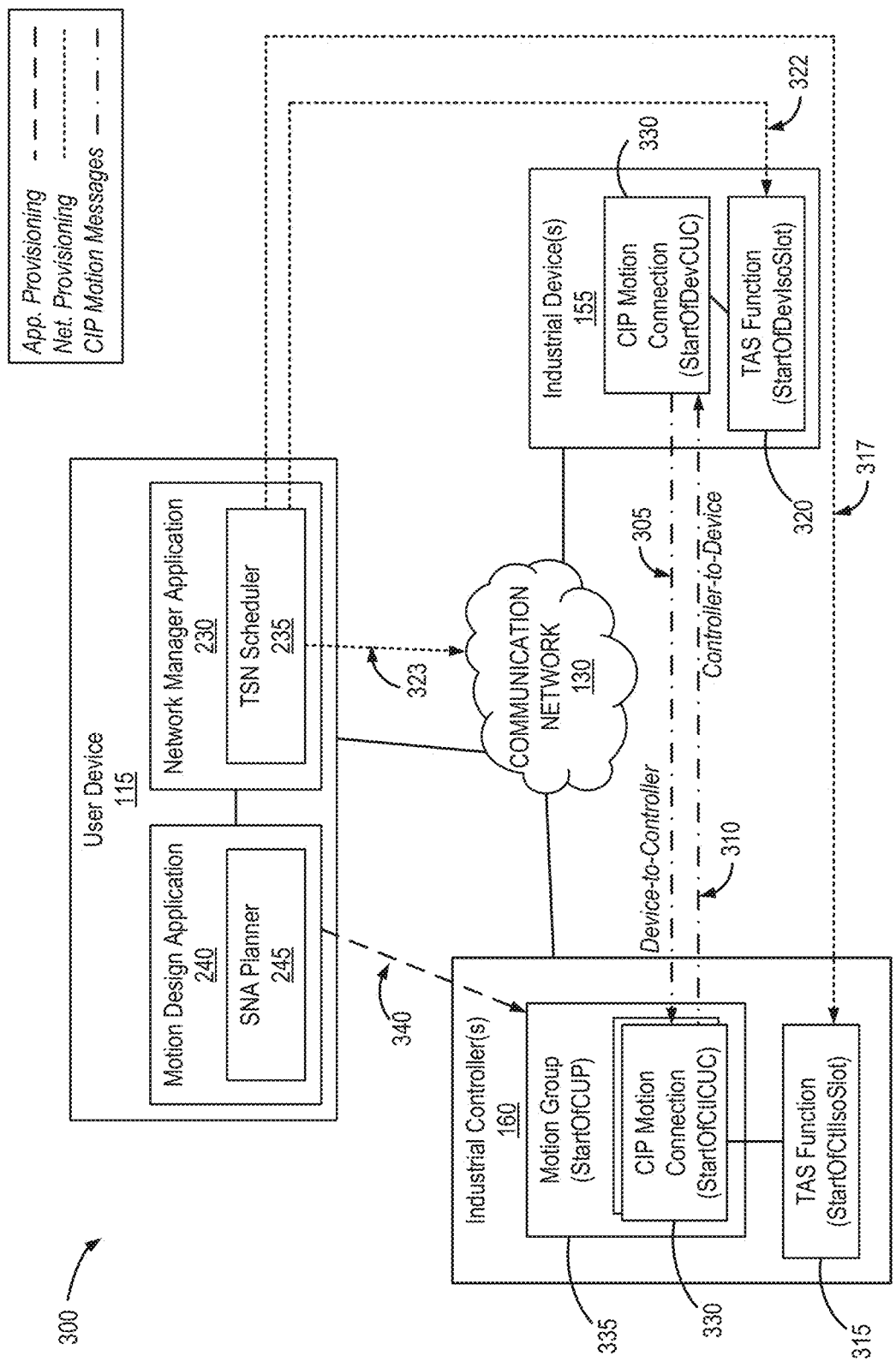
FIG. 3 schematically illustrates an example workflow of the system of FIG. 1 according to some configurations.

FIG. 3 illustrates an example workflow diagram 300 for the system 100 according to some configurations. As part of a provisioning stage, the TSN scheduler 235 may determine TSN network scheduling for transmission of communication (or packets) between the industrial controller 160 and the industrial device 155. In some configurations, the TSN scheduler 235 may determine TSN network scheduling for multi-directional transmission of communication (or packets) between the industrial controller 160 and the industrial device 155, such as, e.g., bi-directional transmission of communication (or packets). As one non-limiting example, as illustrated in FIG. 3, the TSN scheduler 235 may determine TSN network scheduling for transmission of communication (or packets) in a device-to-controller ("D2C") direction 305 and a controller-to-device ("C2D") direction 310. In some configurations, the TSN scheduler 235 determines the TSN network scheduling for each transmission direction independently. For instance, in some configurations, the TSN scheduler 235 may determine the TSN networking scheduling for transmission of communication (or packets) in the D2C direction 305 independently from the TSN networking scheduling for transmission of communication (or packets) in the C2D direction 310.

Alternatively, or in addition, in some configurations, the TSN scheduler 235 may determine a set of Qbv configuration parameters for the industrial controller 160 (e.g., a controller Qbv configuration), a set of Qbv configuration parameters for the industrial device 155 (e.g., a device Qbv configuration), or a combination thereof. A Qbv configuration may include a set of Qbv parameters, including, e.g., a base time, a gating cycle, a gate control list size, a gate control list entry, a gate control time interval (or slot interval), a gate state, a slot offset, a slot structure, etc. A base time may indicate an original time point of Qbv operation and the start of the first gating cycle. The gating cycle may indicate the cycle time for the gate control operation. A gate control list size may indicate the number of gate control entries in the gate control list, which is equal to the number of time slots within a gate control cycle. The gate control list entry may include, e.g., a row of entry ID, slot offset, time interval, and gate state. The time interval (or slot interval) may include a time interval within the gating cycle dedicated to the transmission of the frames for one or more specific stream classes that have respective queues. The gate state may indicate an open state or a close state of gates for queues. The slot offset may indicate a time offset from the start of each gating cycle to the start of a time interval dedicated to the transmission of the frames for one or more specific stream classes that have respective queues. The slot structure may include slots organized in an order within gating cycle.

As illustrated in the example of FIG. 3, the TSN scheduler 235 may transmit (or otherwise provide) one or more Qbv configurations to the industrial controller 160 (e.g., a time-aware shaper ("TAS") function 315 of the industrial controller 160) (represented in FIG. 3 by reference numeral 317), the industrial device 155 (e.g., a TAS function 320 of the industrial device 155) (represented in FIG. 3 by reference numeral 322), the TSN 130 (represented in FIG. 3 by reference numeral 323), or a combination thereof (generally represented in FIG. 3 by the dotted line). In some configurations, the TSN scheduler 235 may transmit (or otherwise provide) the Qbv configuration(s) as part of a network provisioning process.

In some configurations, the electronic processor 200 (via the TSN scheduler 235) may align the controller Qbv configuration parameters for the industrial controller 160 and the device Qbv configuration parameters for the industrial device 155. In some configurations, the electronic processor 200 may align the set of controller Qbv configuration parameters, the set of device Qbv configuration parameters, or a combination thereof according to a CIP motion timing model (e.g., in the SNA planner 245) and adjust TSN network scheduling configurations accordingly via the TSN scheduler 235, as described in greater detail herein. In some configurations, the electronic processor 200 may determine a base start of a connection update period (also referred to herein as "BaseStartOfCUP") for the industrial controller 160 according to the set of controller Qbv configuration parameters and the CIP motion timing model in the SNA planner 245 to synchronize CIP motion connection (represented in FIG. 3 by reference numeral 330) communication to the scheduled network transmission.

As illustrated in the example of FIG. 3, in some configurations, the electronic processor 200 (via the SNA planner 245) may download (or otherwise provide) a motion configuration (or application configuration) to the industrial controller 160 (e.g., a motion group 335 associated with the industrial controller 160) (represented in FIG. 3 by reference numeral 340 and the dashed line). A motion configuration may include, e.g., the BaseStartOfCUP, a connection update period ("CUP") for the industrial controller 160, a timing model (e.g., the CIP motion timing model), and the like.

With respect to an operation stage of the system 100, the CIP motion application and TSN network may operate synchronously with the configuration parameters configured in the provisioning stage. In some configurations, both the industrial controller 160 and the industrial device 155 may check the time variance between the start of CIP motion connection update cycle ("CUC") and the start of the Qbv slot for isochronous traffic is within a defined range (e.g., warning, fault, etc.) and report the check result (e.g., to the user device 115 for display to a user via the display device 260). As used herein, CUC may generally refer to a time that the CIP motion application has to start assembling connection data such that the connection data can arrive at an egress point at a scheduled slot time. In some configurations, the industrial controller 160 may adjust the actual start of CUC according to the time variance to ensure robust SNA operation.

Figure 4:
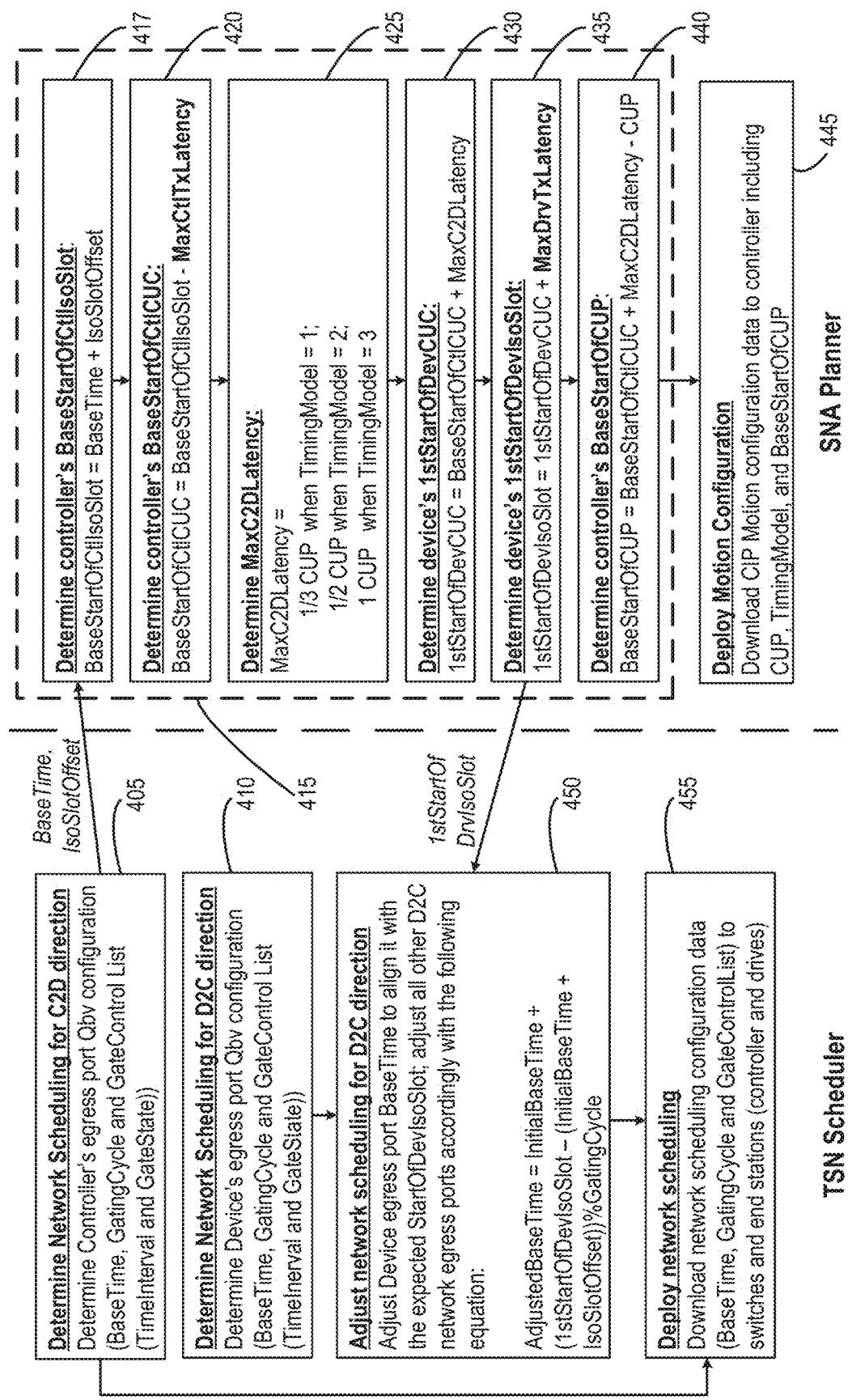
FIG. 4 schematically illustrates a method for synchronizing motion connection communication to time-sensitive networks for industrial systems according to some configurations.

FIG. 4 is a flowchart illustrating a method 400 for synchronizing motion connection communication to TSNs for industrial systems according to some configurations. The method 400 is described herein as being performed by the user device 115 (e.g., the electronic processor 200 executing the network manager application 230, the motion design application 240, or a combination thereof). However, as noted herein, the functionality (or a portion thereof) described as being performed by the electronic processor 200 may be distributed among, and hence performed by, one or more other devices (e.g., the industrial controller(s) 160, a remote server or computing device, etc.).

As illustrated in FIG. 4, the method 400 includes determining network scheduling for multi-directional transmission of communication (or packets). For instance, as illustrated in FIG. 4, the method 400 includes determining, with the electronic processor 200, network scheduling for a C2D direction (at block 405) and determining, with the electronic processor 200, network scheduling for a D2C direction (at block 410). In some configurations, the electronic processor 200 may determine the network scheduling for the C2D direction by determining a controller Qbv configuration (e.g., a set of Qbv configuration parameters for the industrial controller 160). As one non-limiting example, in some configurations, the electronic processor 200 may determine the network scheduling for the C2D direction by determining an egress port Qbv configuration for the industrial controller 160, including, e.g., a base time, a gating cycle, a gate control list (including, e.g., a time interval and a gate state), and the like. In some configurations, the electronic processor 200 may determine the network scheduling for the D2C direction by determining a device Qbv configuration (e.g., a set of Qbv configuration parameters for the industrial device 155). As one non-limiting example, in some configurations, the electronic processor 200 may determine the network scheduling for the D2C direction by determining an egress port Qbv configuration for the industrial device 155, including, e.g., a base time, a gating cycle, a gate control list (including, e.g., a time interval and a gate state), and the like.

As illustrated in the example of FIG. 4, in some configurations, the method 400 includes aligning the start of isochronous slots for the industrial controller 160 and the industrial device 155 in layer 2 of TAS function to the start of CIP motion CUC in application layer according to CIP motion timing model. As illustrated in FIG. 4, in some configurations, the electronic processor 200 may perform the alignment by performing a sub-method (illustrated in FIG. 4 by dashed block 415).

In some configurations, the electronic processor 200 may determine a base start of a Qbv slot for isochronous traffic for the industrial controller 160 (also referred to herein as "BaseStartOfCtlIsoSlot") (at block 417). In some configurations, the electronic processor 200 may determine the BaseStartOfCtlIsoSlot based on the controller Qbv configuration. As one non-limiting example, the electronic processor 200 may determine the BaseStartOfCtlIsoSlot based on a base time, an isochronous slot offset (also referred to herein as "IsoSlotOffset"), or a combination thereof. In some configurations, the electronic processor 200 may determine the BaseStartOfCtlIsoSlot as the sum of the base time and the IsoSlotOffset (e.g., BaseStartOfCtlIsoSlot=BaseTime+IsoSlotOffset).

In some configurations, the electronic processor 200 may determine a base start of a CUC for isochronous traffic for the industrial controller 160 (also referred to herein as "BaseStartOfCtlCUC") (at block 420). The electronic processor 200 may determine the BaseStartOfCtlCUC based at least on the controller Qbv configurations (e.g., an egress port Qbv configuration of the industrial controller 160). In some configurations, the electronic processor 200 may determine the BaseStartOfCtlCUC based at least on a maximum control transmission latency (also referred to herein as "MaxCtlTxLatency") and the BaseStartOfCtlIsoSlot. The MaxCtlTxLatency may be the maximum latency from the timepoint that the industrial controller 160 starts updating the connection to the timepoint that the egress port of the industrial controller 160 starts opening the slot for the stream transmission. The egress port may be the egress port for the industrial controller 160 or an egress port for a connected switch, such as, e.g., when the industrial controller 160 does not support the TAS function 315. In some configurations, the electronic processor 200 may determine the BaseStartOfCtlCUC as a difference between the BaseStartOfCtlIsoSlot and the MaxCtlTxLatency (e.g., BaseStartOfCtlCUC=BaseStartOfCtlIsoSlot−the MaxCtlTxLatency).

As illustrated in FIG. 4, in some configurations, the electronic processor 200 may determine a maximum C2D latency (also referred to herein as "MaxC2DLatency") (at block 425). The MaxC2DLatency may be the maximum transmission latency associated with transmissions from the industrial controller 160 to the industrial device 155 (e.g., the C2D direction 310 of FIG. 3). In some configurations, the MaxC2DLatency may be associated with or based on a CUP, the timing model, or a combination thereof. As one non-limiting example, the MaxC2DLatency may be ⅓ CUP when the timing model is 1 (e.g., one-cycle timing model). As another non-limiting example, the MaxC2DLatency may be ½ CUP when the timing model is 2 (e.g., two-cycle timing model). As yet another non-limiting example, the MaxC2DLatency may be 1 CUP when the timing model is 3 (e.g., three-cycle timing model). In some configurations, the electronic processor 200 may determine a maximum D2C latency (also referred to herein as "MaxD2CLatency"). The MaxD2CLatency may be the maximum transmission latency associated with transmissions from the industrial device 155 to the industrial controller 160 (e.g., the D2C direction 305 of FIG. 3).

The electronic processor 200 may determine a first start of a CUC for the industrial device 155 (also referred to herein as "1stStartOfDevCUC") (at block 430). In some configurations, the electronic processor 200 may determine the 1stStartOfDevCUC based on the BaseStartOfCtlCUC, the MaxC2DLatency, or a combination thereof. As one non-limiting example, in some configurations, the electronic processor 200 may determine the 1stStartOfDevCUC as the sum of the BaseStartOfCtlCUC and the MaxC2DLatency (e.g., 1stStartOfDevCUC=BaseStartOfCtlCUC+the MaxC2DLatency).

As illustrated in FIG. 4, at block 435, the electronic processor 200 may determine a first start of a Qbv slot for isochronous traffic for the industrial device 155 (also referred to herein as "1 stStartOfDevIsoSlot"). In some configurations, the electronic processor 200 may determine the 1stStartOfDevIsoSlot based on the 1stStartOfDevCUC and a maximum transmission latency for the industrial device 155 (also referred to herein as "MaxDevTxLatency"). The MaxDevTxLatency may be the maximum latency from the timepoint that the industrial device 155 starts updating the connection to the timepoint that the egress port of the industrial device 155 starts opening the slot for the stream transmission. The egress port may be the egress port for the industrial device 155 or an egress port for a connected switch, such as, e.g., when the industrial device 155 does not support the TAS function 320. As one non-limiting example, in some configurations, the electronic processor 200 may determine the 1stStartOfDevIsoSlot as the sum of the 1stStartOfDevCUC and the MaxDevTxLatency (e.g., 1stStartOfDevIsoSlot=1 stStartOfDevCUC+MaxDevTxLatency).

The electronic processor 200 may determine a base start of a CUP for the industrial controller 160 (also referred to herein as "BaseStartOfCUP") (at block 440). In some configurations, the electronic processor 200 may determine the BaseStartOfCUP based on the BaseStartOfCtlCUC, the MaxC2DLatency, the CUP, or a combination thereof. As one non-limiting example, in some configurations, the electronic processor 200 may determine the BaseStartOfCUP as the result of adding the BaseStartOfCtlCUC to the MaxC2DLatency and subtracting the CUP from the sum of BaseStartOfCtlCUC and the MaxC2DLatency (e.g., BaseStartOfCUP=BaseStartOfCtlCUC+MaxC2DLatency−CUP).

In some configurations, the electronic processor 200 may deploy a motion configuration to the industrial controller 160 (at block 445). In some configurations, the electronic processor 200 may determine the motion configuration based on the BaseStartOfCUP, the CUP, and the timing model. As one non-limiting example, in some configurations, the electronic processor 200 may download CIP motion configuration data (e.g., the motion configuration) to the industrial controller 160, where the CIP motion configuration data includes the CUP, the timing model, and the BaseStartOfCUP.

Accordingly, in some configurations, the electronic processor 200 may determine the BaseStartOfCUP based on a difference between the 1stStartOfDevCUC and the CUP and deploy a motion configuration to the industrial controller 160, where the motion configuration includes the BaseStartOfCUP, the CUP, and the timing model.

As illustrated in FIG. 4, in some configurations, the electronic processor 200 may adjust network scheduling for the D2C direction (e.g., the D2C direction 305 of FIG. 3). The electronic processor 200 may adjust the network scheduling for the D2C direction based at least in part on the 1stStartOfDevIsoSlot. In some configurations, the electronic processor 200 may adjust the network scheduling for the D2C direction 305 by adjusting an egress port of the industrial device 155. In some configurations, the electronic processor 200 may adjust the network scheduling for the industrial device 155 by adjusting a base time associated with an egress port of the industrial device 155. As one non-limiting example, the electronic processor 200 may adjust an egress port base time of the industrial device 155 to align with an expected StartOfDevIsoSlot. In some configurations, the electronic processor 200 may adjust additional D2C network egress ports accordingly. In some configurations, the electronic processor 200 may determine the adjusted network scheduling (e.g., an adjusted base time) based on, e.g., an initial base time (also referred to herein as "InitialBaseTime"), the 1stStartOfDevIsoSlot, an isochronous slot offset parameter (also referred to herein as "IsoSlotOffset"), and a gating cycle. As one non-limiting example, in some configurations, the electronic processor 200 may determine the adjusted network scheduling (e.g., the adjusted base time) as the result of: InitialBaseTime+(1stStartOfDevIsoSlot−(InitialBaseTime+IsoSlotOffset))% GatingCycle.

The electronic processor 200 may deploy the adjusted network scheduling to the industrial device 155 (at block 455). In some configurations, the electronic processor 200 may deploy the adjusted network scheduling by downloading (or otherwise providing) network scheduling configuration data (e.g., a base time, a gating cycle, a gate control list, etc.) to one or more switches, end stations, etc. (e.g., the industrial controller 160, the industrial device 155, another component of the industrial system 105, or a combination thereof). As one non-limiting example, when the adjusted network scheduling includes an adjusted base time associated with an egress port of the industrial device 155, the electronic processor 200 may deploy the adjusted network scheduling (e.g., an adjusted base time, a gating cycle, a gate control list, etc.) to the egress port of the industrial device 155.

Figure 5:
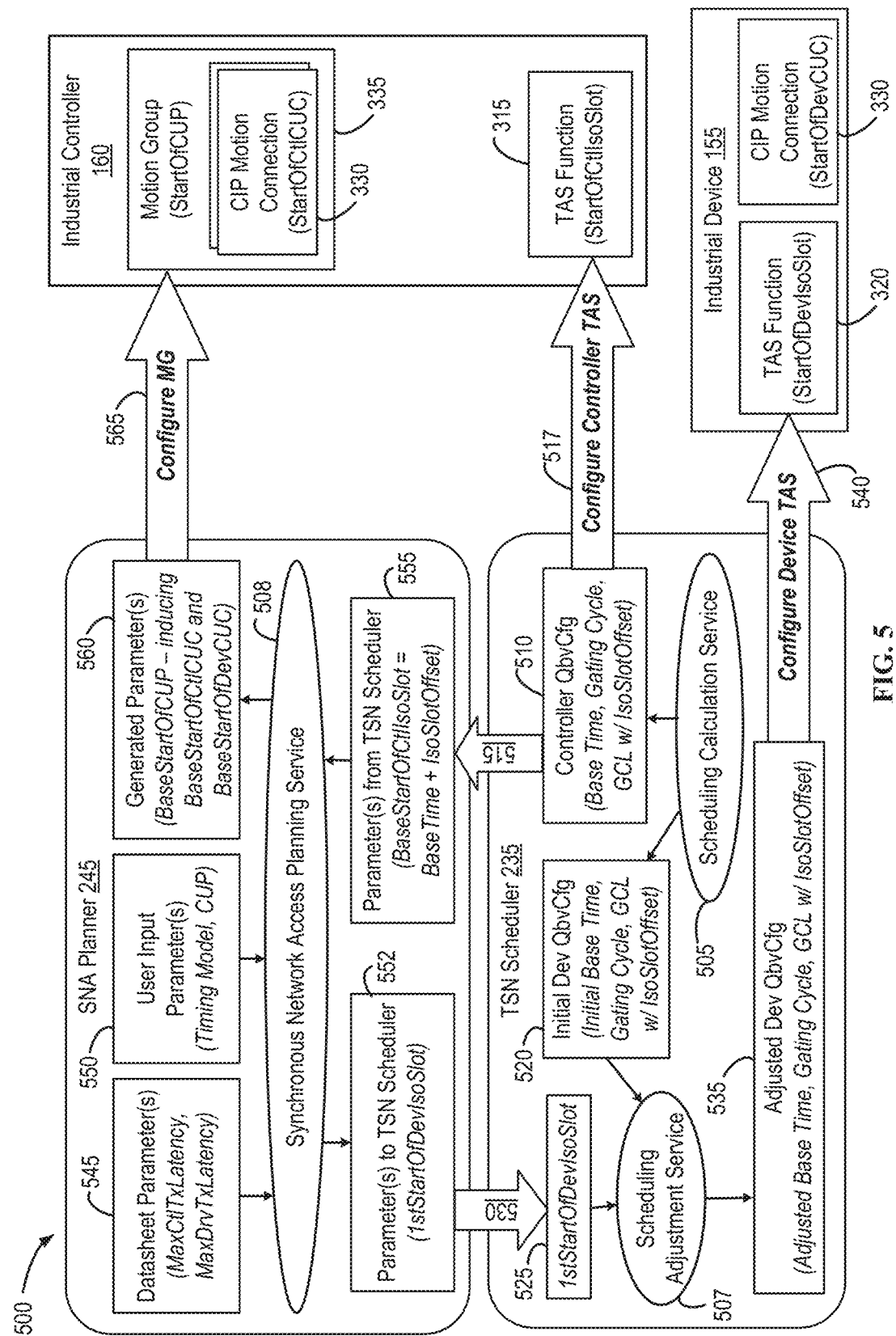
FIG. 5 schematically illustrates an example architecture for implementing the method of FIG. 4 according to some configurations.

FIG. 5 illustrates an example architecture diagram 500 according to some configurations. As illustrated in FIG. 5, the architecture diagram 500 includes the SNA planner 245 and the TSN scheduler 235.

In the example of FIG. 5, the TSN scheduler 235 may provide a scheduling calculation service 505 and a scheduling adjustment service 507. The scheduling calculation service 505 may be executed (e.g., by the electronic processor 200 as part of the TSN scheduler 235) to determine network scheduling for one or more transmission directions (e.g., the C2D direction 305 and the D2C direction 310 of FIG. 3). In some configurations, the scheduling calculation service 505 may be associated with or perform the functionality associated with blocks 405 and 410 of FIG. 4. The scheduling adjustment service 507 may be executed (e.g., by the electronic processor 200 as part of the TSN scheduler 235) to adjust network scheduling for, e.g., the D2C direction (e.g., the D2C direction 310 of FIG. 3). In some configurations, the scheduling adjustment service 507 may be associated with or perform the functionality associated with block 450 of FIG. 4. In the example of FIG. 5, the SNA planner 245 may provide a SNA planning service 508. The SNA planning service 508 may be executed (e.g., by the electronic processor 200 as part of the SNA Planner 245) to determine motion configuration parameters, including, e.g., the BaseStartOfCUP and the industrial device Qbv configuration parameters, including, e.g., the 1stStartOfDevIsoSlot. In some configurations, the SNA planning service 508 may be associated with or perform the functionality associated with blocks 417, 420, 425, 430, 435, and 440 of FIG. 4.

In the example of FIG. 5, the scheduling calculation service 505 may determine the controller Qbv configuration for the industrial controller 160, including, e.g., a base time, a gating cycle, a gate control list with isochronous slot offset, etc. (represented in FIG. 5 by reference numeral 510). As illustrated in FIG. 5, the scheduling calculation service 505 may provide the controller Qbv configuration 510 to the SNA planner 245 (represented in FIG. 5 by arrow 515). In some configurations, the scheduling calculation service 505 may provide the controller Qbv configuration 510 to the industrial controller 160. As illustrated in FIG. 5, in some configurations, the controller Qbv configuration 510 may be used (e.g., deployed) to configure a controller TAS function (e.g., the TAS function 315) associated with the industrial controller 160 (represented in FIG. 5 by arrow 517).

In some configurations, the scheduling calculation service 505 may determine an initial device Qbv configuration for the industrial device 155, including, e.g., an initial base time, a gating cycle, a gate control list with isochronous slot offset, etc. (represented in FIG. 5 by reference numeral 520). The scheduling calculation service 505 may provide the initial device Qbv configuration 520 to the scheduling adjustment service 507. As illustrated in FIG. 5, the scheduling adjustment service 507 may receive (e.g., from the SNA planner 245) a 1stStartOfDevIsoSlot 525 (represented in FIG. 5 by arrow 530). In some configurations, the scheduling adjustment service 507 may determine an adjusted device Qbv configuration, including, e.g., an adjusted base time, a gating cycle, a gate control list with isochronous slot offset, etc. (represented in FIG. 5 by reference numeral 535). As illustrated in FIG. 5, in some configurations, the adjusted device Qbv configuration 535 may be used (e.g., deployed) to configure a device TAS function (e.g., the TAS function 320) associated with the industrial device 155 (represented in FIG. 5 by arrow 540).

In the illustrated example of FIG. 5, the SNA planning service 508 (e.g., the SNA planner 235) receives (or otherwise accesses) one or more datasheet parameters 545 and one or more user input parameters 550. The datasheet parameter(s) 545 may include, e.g., a maximum industrial controller transmission latency ("MaxCtlTxLatency") parameter, a maximum industrial device transmission latency ("MaxDevTxLatency") parameter, etc. The user input parameter(s) 550 may include, e.g., a timing model ("TM"), a CUP, etc. In some configurations, the SNA planning service 508 may generate one or more parameters as a set of generated parameter(s) 552 (e.g., 1stStartOfDevIsoSlot) based at least on the datasheet parameter(s) 545, the user input parameter(s) 550, or a combination thereof. The SNA planning service 508 may provide the generated parameter(s) 552 (e.g., 1stStartOfDevIsoSlot) to the TSN scheduler 235 (e.g., 1stStartOfDevIsoSlot 525). The transmission of the parameters 552 to the TSN scheduler 235 is represented in FIG. 5 by arrow 530.

The SNA planning service 508 may receive (or otherwise access) one or more parameters from the TSN scheduler 235 (represented in FIG. 5 by reference numeral 555). The SNA planning service 508 may generate one or more parameters as a set of generated parameters 560. The set of generated parameters 560 may include, e.g., BaseStartOfCUP, which may induce BaseStartOfCtlCUC and BaseStartOfDevCUC, as illustrated in FIG. 5. The SNA planner 245 may use the set of generated parameters 560 (or a portion thereof) to configure a motion group ("MG") (e.g., the motion group 335 of FIG. 3) (e.g., the industrial controller(s) 160) (represented in FIG. 5 by arrow 565). As referred to herein, a MG may include a set of one or more connections (e.g., connections between one or more components of the industrial system 105).

Figure 6:
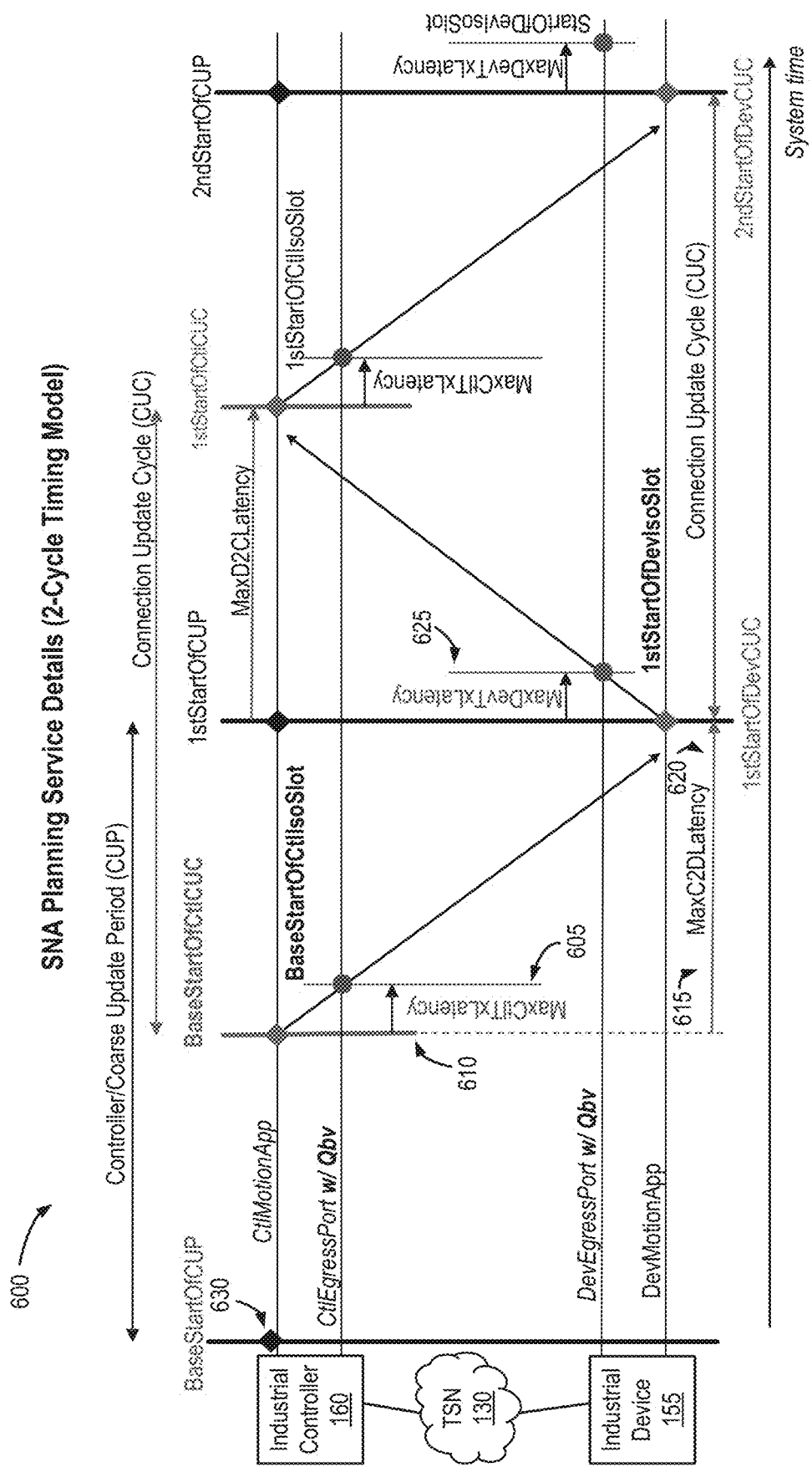
FIGS. 6-7 are example timing models according to some configurations.

FIG. 6 is an example two-cycle timing model 600 according to some configurations. In the illustrated example of FIG. 6, the two-cycle timing model represents functionality associated with the SNA planning service 508 (e.g., functionality performed by the electronic processor 200, such as, e.g., when executing the SNA planner 245). At a first point 605, the electronic processor 200 may determine the BaseStartOfCtlIsoSlot according to, e.g., the egress port Qbv configuration for the industrial controller 160 (as described in greater detail herein with respect to, e.g., block 417 of FIG. 4). At a second point 610, the electronic processor 200 may determine the BaseStartOfCtlCUC according to, e.g., the BaseStartOfCtlIsoSlot and MaxCtlTxLatency (as described in greater detail herein with respect to, e.g., block 420 of FIG. 4). At a third point 615, the electronic processor 200 may determine the MaxC2DLatency according to, e.g., the CUP and the TM (as described in greater detail herein with respect to, e.g., block 425 of FIG. 4). At a fourth point 620, the electronic processor 200 may determine the 1stStartOfDevCUC according to, e.g., the BaseStartOfCtlCUC and the MaxC2DLatency (as described in greater detail herein with respect to, e.g., block 430 of FIG. 4). At a fifth point 625, the electronic processor 200 may determine the 1stStartOfDevIsoSlot according to, e.g., the 1stStartOfDevCUC and the MaxDevTxLatency, and adjust the network scheduling based on the 1stStartOfDevIsoSlot (as described in greater detail herein with respect to, e.g., blocks 435 and 450 of FIG. 4). At a sixth point 630, the electronic processor 200 may determine the BaseStartOfCUP according to, e.g., the BaseStartOfCtlCUC, the MaxC2DLatency, and the CUP (as described in greater detail herein with respect to, e.g., block 440 of FIG. 4).

Figure 7:
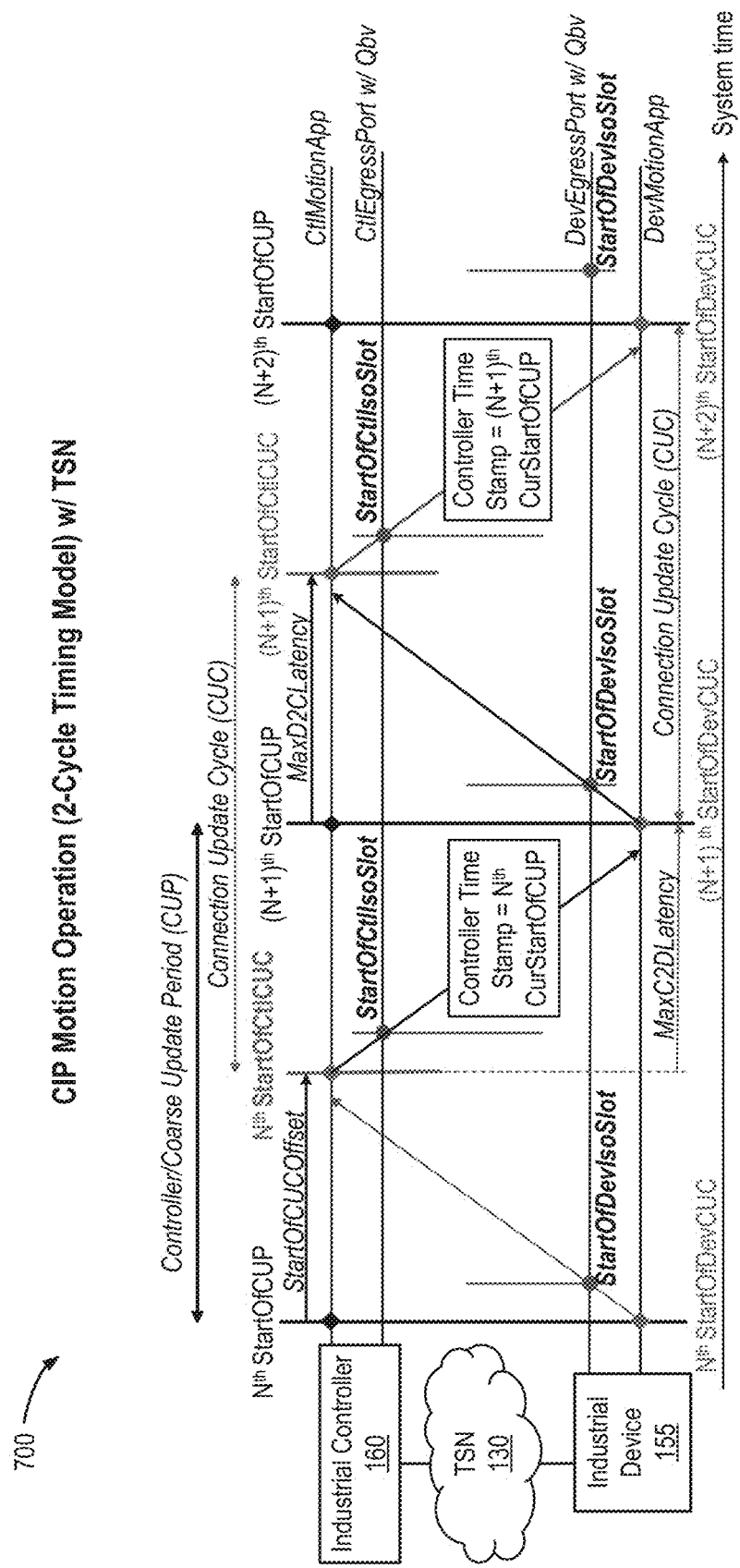

FIG. 7 illustrates another two-cycle timing model 700 according to some configurations. As illustrated in FIG. 7, the industrial controller 160 and the industrial device 155 support TSN capabilities (e.g., Qbv) and CIP motion traffic is scheduled traffic. The industrial controller 160 and the industrial device 155 may also support SNA to ensure the C2D direction 305 and the D2C direction 310 traffic arrive on the respective egress ports for transmission at the scheduled time (e.g., not too early and not too late). Accordingly, in some configurations, network schedules CIP Motion traffic by allocating dedicated resources (e.g., time slot, queue, etc.) of TSN switches (e.g., egress ports) to ensure CIP Motion traffic to pass the network within the controlled maximum latency.

Figure 8:
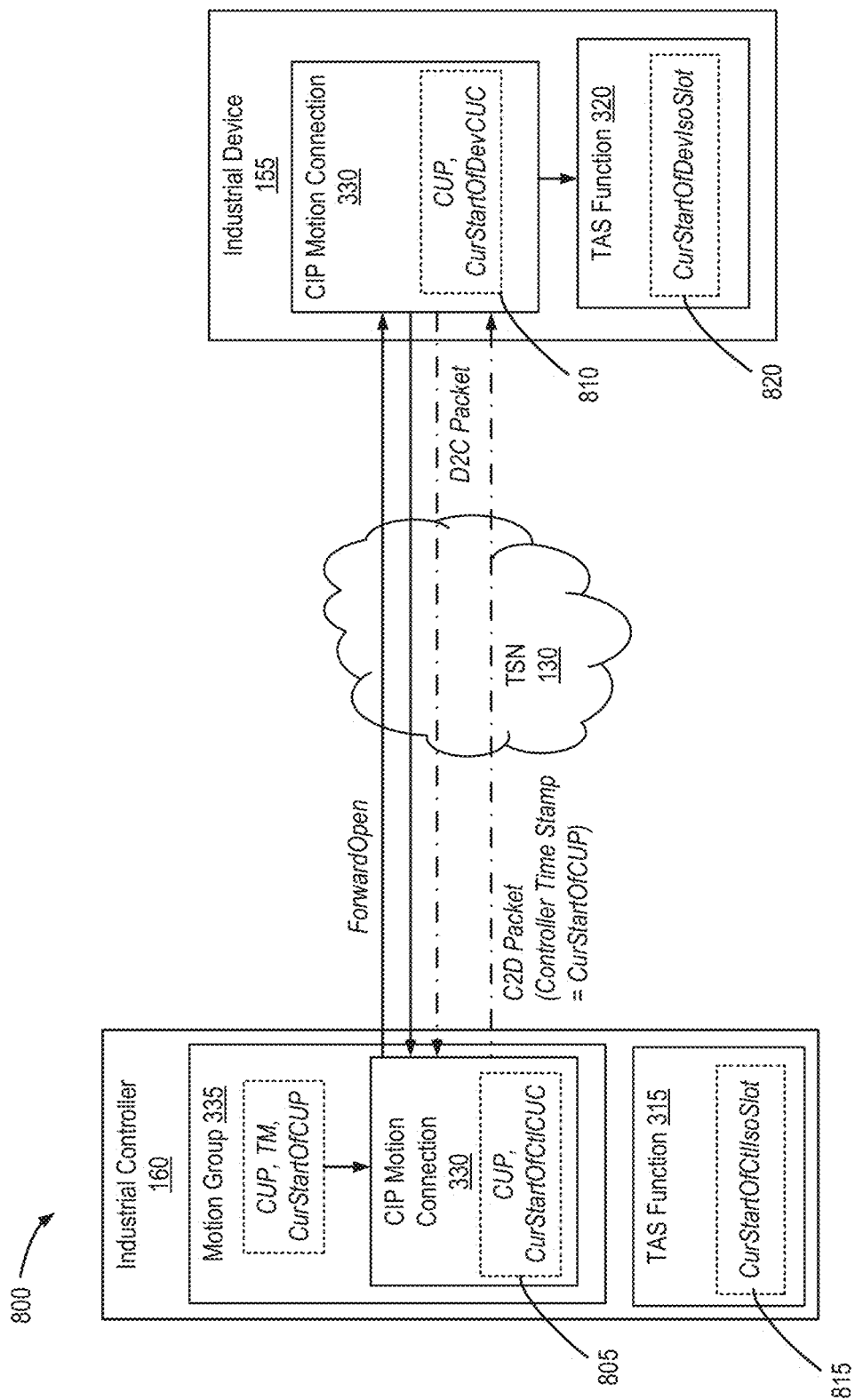
FIG. 8 illustrates an example operation diagram for an industrial controller and an industrial device according to some configurations.

FIG. 8 illustrates an example operation diagram 800 for the industrial controller 160 and the industrial device 155 according to some configurations. With reference to FIG. 8, in a converged TSN network (e.g., the TSN 130), where the start of Qbv slots for isochronous traffic in the network layer for the industrial controller 160 and the industrial device 155 are aligned to the start of CIP Motion CUC (e.g., "CurStartOfCUP" of FIG. 8) in the application layer according to CIP Motion TM, CIP Motion and TSN Network may operate synchronously with the synchronous network access parameters configured in provisioning stage, as described in greater detail herein. Alternatively, or in addition, in some configurations, the industrial controller 160, the industrial device 155, or a combination thereof may check the time variance between the start of CIP Motion CUC (also referred to herein as "CurStartOfCtlCUC" for the industrial controller 160 and "CurStartOfDevCUC" for the industrial device 155) (represented in FIG. 8 by reference numerals 805 and 810, respectively) and the start of the Qbv isochronous slot (also referred to herein as "CurStartOfCtlIsoSlot" for the industrial controller 160 and "CurStartOfDevIsoSlot" for the industrial device 155) (represented in FIG. 8 by reference numerals 815 and 820, respectively) is within a defined range (e.g., warning, fault), report the check result. In some configurations, the industrial controller 160 may adjust the actual Start of CUC according to the time variance to ensure the robust SNA operation.

Figure 9:
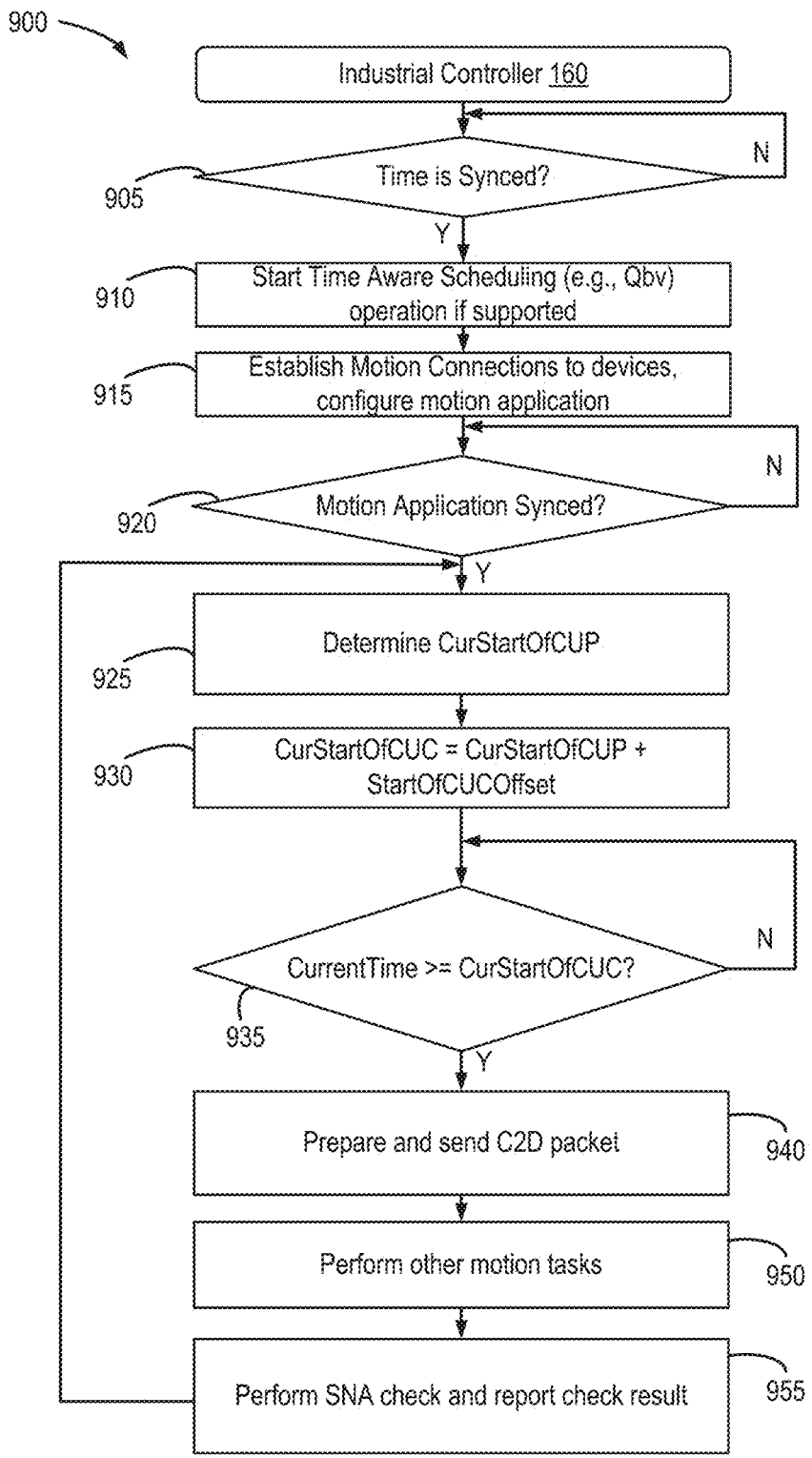
FIG. 9 is a flowchart of a method describing operation of an industrial controller during an operation stage according to some configurations.

FIG. 9 is a flowchart of a method 900 describing operation of the industrial controller 160 during an operation stage according to some configurations. As illustrated in FIG. 9, the method 900 includes performing a time synchronization check (at block 905). When the industrial controller 160 determines that the time is synced (Yes at block 905), the industrial controller 160 may start time aware scheduling operation (at block 910). The industrial controller 160 may establish motion connections to one or more of the industrial device(s) 155 and configure one or more motion applications associated with the one or more industrial device(s) 155 (at block 915). The industrial controller 160 may determine whether a motion application is synced (at block 920).

When the industrial controller 160 determines that the motion application is synced (Yes at block 920), the industrial controller 160 may determine a CurStartOfCUP (at block 925). In some configurations, the industrial controller 160 may determine the CurStartOfCUP as the result of: BaseStartOfCUP+N*CUP, where N may be the smallest integer number for the relation of CurStartOfCUP>=Current Time. The industrial controller 160 may calculate the CurStartOfCUC as a sum of CurStartOfCUP and StartOfCUCOffset, where the StartOfCUCOffset is the time offset parameter from the start of current CUP to the start of current CUC, associated with the TM (at block 930). The industrial controller 160 may determine it is time to start a CUC (at block 935). In some configurations, the industrial controller 160 may determine whether it is time to start a CUC by determining whether a current time is greater than or equal to the CurStartOfCUC.

When the industrial controller 160 determines that it is time to start a CUC (Yes at block 935), the industrial controller 160 may prepare and send a C2D packet to the industrial device 155 (via, e.g., the TSN 130) (at block 940). The industrial controller 160 may perform one or more (other) motion tasks (at block 950). The industrial controller 160 may perform a SNA check (e.g., determine a time variance), report check result, or a combination thereof (at block 955). In some configurations, the industrial controller 160 may make an adjustment to the alignment between the motion application connection update and the network scheduling based on the SNA check. As one non-limiting example, in some configurations, the industrial controller 160 may adjust the parameter StartOfCUCOffset. In some configurations, the industrial controller 160 may determine whether to make an adjustment based on whether a time variance is within a defined range. In some configurations, the industrial controller 160 may determine the time variance as the result of: (CurStartOfCUP+StartOfCUCOffset+MaxCtlTxLatency)−CurStartOfCtlIsoSlot.

Figure 10:
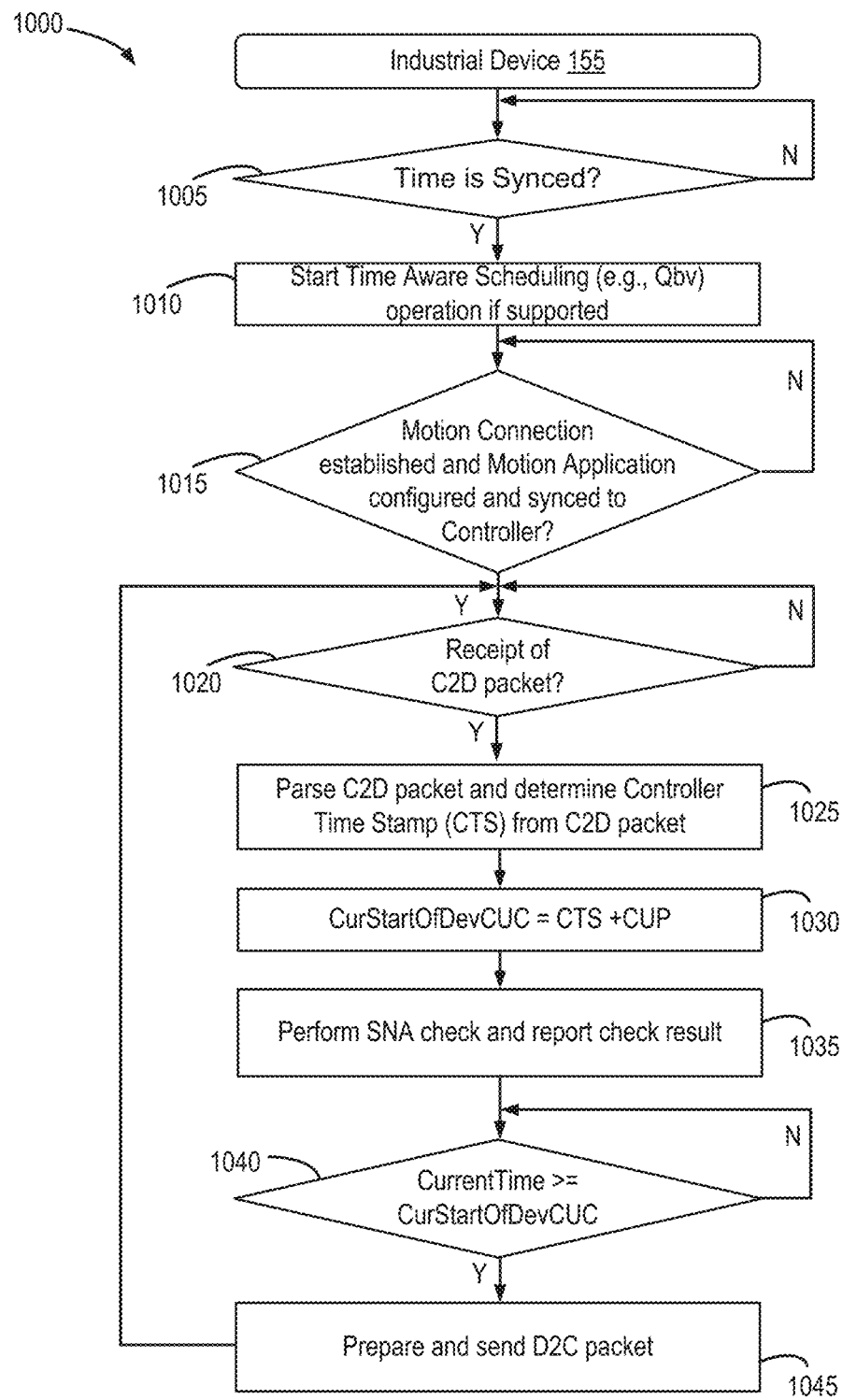
FIG. 10 is a flowchart of a method describing operation of an industrial device during an operation stage according to some configurations.

FIG. 10 is a flowchart of a method 1000 describing operation of the industrial device 155 during an operation stage according to some configurations. As illustrated in FIG. 10, the method 1000 includes performing a time synchronization check (at block 1005). When the industrial device 155 determines that the time is synced (Yes at block 1005), the industrial device 155 may start time aware scheduling operation (at block 1010). The industrial device 155 may determine whether motion connection is established and whether a motion application is configured and synced to the industrial controller 160 (at block 1015). When the industrial device 155 determines that the motion connection is established and that the motion application is configured and synced to the industrial controller 160 (Yes at block 1015), the industrial device 155 may monitor for receipt of a C2D packet (at block 1020). When the industrial device 155 detects receipt of the C2D packet (Yes at block 1020), the industrial device 155 may parse the C2D packet and determine a controller time stamp ("CTS") from the C2D packet (at block 1025). The industrial device 155 may calculate the CurStartOfCUC as a sum of CTS and CUP (at block 1030). The industrial device 155 may then perform an SNA check and report check results (at block 1035). In some configurations, the industrial device 155 may perform the SNA check to determine whether a time variance is within a defined range. In some configurations, the time variance may be the result of: CurStartOfDevCUC+MaxDevTxLatency-CurStartOfDevIsoSlot. In some configurations, the industrial device 155 may determine whether a current time is greater than or equal to the CurStartOfDevCUC (at block 1040). When the industrial device 155 determines that the current time is greater than or equal to the CurStartOfDev- CUC (Yes at block 1040), the industrial device 155 may prepare and send a D2C packet (at block 1045).

In some configurations, the technology disclosed herein (e.g., the method of synchronous network access) may be extensible to CIP motion applications of a non-TSN industrial controller and industrial device. In such configurations, the technology disclosed herein may use the TAS function in a switch connected to the non-TSN industrial controller and device for CIP motion traffic scheduling. In such configurations, the MaxCtlTxLatency and the MaxDevTxLatency may represent the maximum latency from the timepoint that the controller and device, respectively, starts updating the connection to the timepoint that the switch egress port start opening the slot for the stream transmission (e.g., controller/device internal latency (transmission latency+queue latency)+hop link latency+connected switch latency).

Accordingly, the technology disclosed herein provides methods and systems that provide, in a converged TSN network, reduced controller and devices' network access latency and jitter while increasing CIP Motion performance. The technology disclosed herein may be naturally integrated into system provisioning and operation process, such that the integration is invisible to the user, easy to use, and maintains CIP motion user experience. The technology disclosed herein may be implemented with TSN controller and device hardware, non-TSN controller and device hardware, or a combination thereof. Accordingly, the technology disclosed herein enables smooth product migration. Additionally, the technology disclosed herein may be implemented without architecture change to controller and device CIP motion firmware. Accordingly, the technology disclosed herein protects existing investments on firmware architecture of controller and device and the technology disclosed herein is decouple from network scheduling calculation function/service.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for synchronizing motion connection communication within time-sensitive networks (TSN) for industrial systems, the system comprising:
    an electronic processor configured to:
        determine a controller Qbv configuration for an industrial controller included in a TSN;
        determine, based at least in part on the controller Qbv configuration, a base start of a controller update period for the industrial controller;
        determine, based at least in part on the base start of the controller update cycle for the industrial controller, a maximum transmission latency associated with transmission from the industrial controller to an industrial device, and a first start of a connection update cycle for the industrial device, a first start of a Qbv slot for isochronous traffic for the industrial device included in the TSN; and
        adjust, based at least in part on the first start of the Qbv slot for isochronous traffic for the industrial device, network scheduling for the industrial device.

2. The system of claim 1, wherein the electronic processor is further configured to:
    determine an initial device Qbv configuration for the industrial device, wherein the initial device Qbv configuration includes at least one of a base time, a gating cycle, a gate control list, a time interval, or a gate state,
    wherein the electronic processor is configured to adjust the network scheduling for the industrial device based at least in part on the first start of the Qbv slot for isochronous traffic and the initial device Qbv configuration.

3. The system of claim 1, wherein the electronic processor is further configured to:
    determine, based on the controller Qbv configuration, a base start of a Qbv slot for isochronous traffic for the industrial controller,
    wherein the electronic processor is configured to determine the first start of the Qbv slot for isochronous traffic from the industrial device based at least in part on the base start of a Qbv slot for isochronous traffic for the industrial controller.

4. The system of claim 3, wherein the electronic processor is configured to determine the first start of the Qbv slot for isochronous traffic for the industrial device based at least in part on the base start of the Qbv slot for isochronous traffic for the industrial controller, a timing model, and a maximum transmission latency associated with the industrial device.

5. The system of claim 3, wherein the electronic processor is configured to determine the base start of the Qbv slot for isochronous traffic for the industrial controller based on a base time included in the controller Qbv configuration and an isochronous slot offset parameter.

6. The system of claim 1, wherein the electronic processor is further configured to:
    deploy the adjusted network scheduling to the industrial device.

7. The system of claim 1, wherein the electronic processor is configured to determine the first start of the Qbv slot for isochronous traffic for the industrial device by:
    determining the base start of the connection update cycle for the industrial controller;

determining the maximum transmission latency associated with transmission from the industrial controller to the industrial device; and determining the first start of the connection update cycle for the industrial device.

8. The system of claim 1, wherein the electronic processor is further configured to:

determine the base start of a controller update period for the industrial controller based on the base start of the Qbv slot for isochronous traffic, a maximum transmission latency associated with the industrial controller, the maximum transmission latency associated with transmission from the industrial controller to the industrial device, and the controller update period; and deploy a motion configuration to the industrial controller, wherein the motion configuration includes the base start of the controller update period for the industrial controller, the controller update period, and a timing model.

9. The system of claim 1, wherein the electronic processor is configured to adjust the network scheduling for the industrial device by adjusting a base time associated with an egress port of the industrial device, and wherein the electronic processor is configured to deploy the adjusted network scheduling to the industrial device by deploying the adjusted base time to the egress port of the industrial device.

10. A method for synchronizing motion connection communication within time-sensitive networks (TSN) for industrial systems, the method comprising:

determining, with an electronic processor, a controller Qbv configuration for an industrial controller included in a TSN;

determining, with the electronic processor, a device Qbv configuration for an industrial device included in the TSN;

determining, with the electronic processor, based on the controller Qbv configuration, a base start of a Qbv slot for isochronous traffic for the industrial controller;

determining, with the electronic processor a base start of a controller update period for the industrial controller based on the base start of the Qbv slot for isochronous traffic for the industrial controller, a maximum transmission latency associated with the industrial controller, a maximum transmission latency associated with transmission from the industrial controller to the industrial device, and the controller update period;

determining, with the electronic processor, based at least in part on the base start of the Qbv slot for isochronous traffic for the industrial controller, a first start of a Qbv slot for isochronous traffic for the industrial device;

adjusting, with the electronic processor, based at least in part on the first start of the Qbv slot for isochronous traffic for the industrial device, network scheduling for the industrial device;

deploying, with the electronic processor, the adjusted network scheduling to the industrial device; and deploying a motion configuration to the industrial controller, wherein the motion configuration includes the base start of the controller update period for the industrial controller, the controller update period, and a timing model.

11. The method of claim 10, wherein determining the first start of the Qbv slot for isochronous traffic for the industrial device includes determining the first start of the Qbv slot for isochronous traffic for the industrial device based at least in part on the base start of the Qbv slot for isochronous traffic for the industrial controller, the timing model, and the maximum transmission latency associated with the industrial device.

12. The method of claim 10, wherein determining the first start of the Qbv slot for isochronous traffic for the industrial device includes:

determining a base start of a connection update cycle for the industrial controller;

determining the maximum transmission latency associated with transmission from the industrial controller to the industrial device; and determining a first start of a connection update cycle for the industrial device.

13. The method of claim 10, wherein determining the base start of the Qbv slot for isochronous traffic for the industrial controller includes determining the base start of the Qbv slot for isochronous traffic for the industrial controller based on a base time included in the controller Qbv configuration and an isochronous slot offset parameter.

14. The method of claim 10, wherein adjusting the network scheduling for the industrial device includes adjusting a base time associated with an egress port of the industrial device, and wherein deploying the adjusted network scheduling includes deploying the adjusted base time to the egress port of the industrial device.

15. A non-transitory computer-readable medium storing instructions that, when executed by an electronic processor, perform a set of functions, the set of functions comprising:

determining a controller Qbv configuration for an industrial controller included in a TSN;

determining a device Qbv configuration for an industrial device included in the TSN;

determining, based on the controller Qbv configuration, a base start of a Qbv slot for isochronous traffic for the industrial controller;

determining, based at least in part on the base start of the Qbv slot for isochronous traffic, a first start of a Qbv slot for isochronous traffic for the industrial device;

adjusting, based at least in part on the first start of the Qbv slot for isochronous traffic for the industrial device and the device Qbv configuration, an adjusted base time associated with an egress port of the industrial device; and deploying the adjusted base time to the egress port of the industrial device.

16. The computer readable medium of claim 15, wherein determining the first start of the Qbv slot for isochronous traffic for the industrial device includes determining the first start of the Qbv slot for isochronous traffic for the industrial device based at least in part on the base start of the Qbv slot for isochronous traffic for the industrial controller, a timing model, and a maximum transmission latency associated with the industrial device.

17. The computer readable medium of claim 15, wherein determining the first start of the Qbv slot for isochronous traffic for the industrial device includes:

determining a base start of a connection update cycle for the industrial controller;

determining a maximum transmission latency associated with transmission from the industrial controller to the industrial device; and determining a first start of a connection update cycle for the industrial device.

18. The computer readable medium of claim 15, wherein determining the base start of the Qbv slot for isochronous traffic for the industrial controller includes determining the base start of the Qbv slot for isochronous traffic for the industrial controller based on a base time included in the controller Qbv configuration and an isochronous slot offset parameter.

\* \* \* \* \*